United States Patent [19]

Weisselberg

[11] 3,708,890
[45] Jan. 9, 1973

[54] ROTARY AIR LOCK APPARATUS

[75] Inventor: Edward B. Weisselberg, Old Tappan, N.J.

[73] Assignee: Wyssmont Company, Inc., Fort Lee, N.J.

[22] Filed: Feb. 5, 1970

[21] Appl. No.: 8,827

[52] U.S. Cl. ..................34/242, 302/49, 214/17 CC, 222/368
[51] Int. Cl. ..............................................B65g 53/40
[58] Field of Search ..............34/92, 242; 214/17 CC; 222/368; 49/42–45; 302/49

[56] References Cited

UNITED STATES PATENTS

| 906,175 | 12/1908 | Waterstraat | 49/44 |
| 1,306,276 | 6/1919 | Peters | 302/49 |
| 1,719,996 | 7/1929 | Peikert | 302/49 |
| 2,715,246 | 8/1955 | Van Doorn | 302/49 X |
| 3,151,784 | 10/1964 | Tailor | 214/17.68 X |
| 3,268,266 | 8/1966 | Brown | 302/49 |

FOREIGN PATENTS OR APPLICATIONS

| 721,850 | 6/1942 | Germany | 302/49 |
| 1,145,201 | 3/1963 | Germany | 222/368 |
| 934,073 | 8/1963 | Great Britain | 214/17.68 |

Primary Examiner—Frederick L. Matteson
Assistant Examiner—Harry B. Ramey
Attorney—Brumbaugh, Graves, Donohue & Raymond

[57] ABSTRACT

Rotary air lock apparatus suitable for high temperature operation includes a generally cylindrical housing having opposed inlet and outlet openings, an elongated shaft journaled centrally within the housing and a plurality of flexible, segmented blades carried by the shaft for rotation within the housing. The blades are constructed to make sealing engagement with the inner cylindrical walls and end walls of the housing, and to allow thermal expansion and contraction of the blades both axially and radially of the housing without impairment of the seal between the blades and the housing. Radiant cooling of the shaft allows high temperature operation without requiring elaborate cooling systems for the shaft bearings.

5 Claims, 5 Drawing Figures

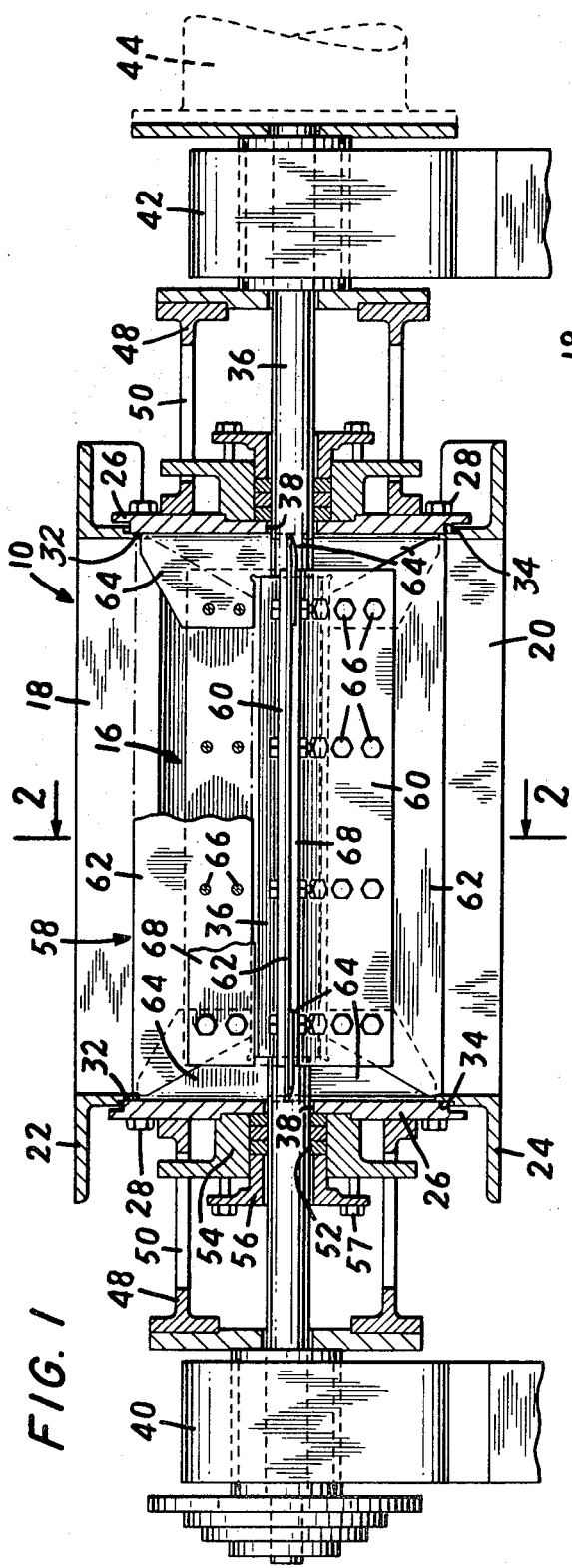

INVENTOR.
EDWARD B. WEISSELBERG 3,708,890

ROTARY AIR LOCK APPARATUS

BACKGROUND OF THE INVENTION

This invention relates generally to rotary air lock apparatus and, more particularly, to apparatus of this type that are adapted to handle materials at widely varying temperatures while continuously maintaining an effective seal against the leakage of gases through the apparatus.

Rotary air locks typically include a cylindrical housing having opposed inlet and outlet openings for material and a pocketed or bladed drum journaled in the housing for carrying material between the inlet and outlet openings. Leakage of air, or other process gases, through these devices is generally sought to be prevented by machining the facing surfaces of the drum and the housing to relatively close tolerances to minimize the clearances between the respective surfaces. Such machining is, of course, costly and requires that the air lock be assembled and maintained with great care to assure that the rotating drum is positioned properly within the housing.

Moreover, known air locks of the kind described are not suitable for operation at certain temperatures, and particularly at high temperatures, because the clearances between the housing and drum are often too small to allow for localized or general expansion of the drum due to temperature gradients. Consequently, the peripheral and end surfaces of the drum sometimes rub against the adjacent surfaces of the housing causing increased friction and wear, or, in extreme circumstances, binding of the drum within the housing. Increasing the clearances between the drum and housing does not satisfactorily eliminate the shortcomings of these devices, since this results in increased leakage of gases, and, in some applications even material, at low and moderate temperatures.

Resilient sealing materials, such as rubber, plastic or the like, have been used to establish a close bearing engagement between the peripheral surfaces of the drum and the air lock housing, but do not entirely avoid the aforementioned disadvantages inasmuch as they allow only limited thermal expansion of the drum and are susceptible of being destroyed, or severely damaged, at high temperatures.

SUMMARY OF THE INVENTION

There is provided, in accordance with the invention, novel rotary air lock apparatus that is especially suitable for handling materials of various particle sizes and consistencies over an extended range of operating temperatures and in both pressurized and unpressurized systems.

Specifically, the air lock apparatus of the present invention includes a generally cylindrical chamber having opposed inlet and outlet openings for passing materials to and from the chamber, a shaft disposed centrally within the chamber, and a plurality of flexible, segmented blades carried by the shaft for establishing and maintaining, at all operating temperatures, sealing engagement with the side walls and end walls of the chamber.

Each blade preferably is constructed of three, sheet-like segments, namely, a center segment for engaging the cylindrical side walls of the chamber and two separate end segments mounted in overlapping relation to the end portions of the center segment for engagement with the end walls of the chamber. The center segment and end segments are sized to allow temperature induced expansion or contraction of the blades in both the longitudinal and radial directions, while maintaining a fully effective seal against the passage of gases through the apparatus.

In a preferred embodiment, the blades are carried on an elongated shaft having two cylindrical end portions and a square central portion, the blades being secured to the square center portion by brackets which extend along the length of the square portion of the shaft. A cylindrical end plate may be attached to the brackets at either end, with separate seals interposed between the end plates and the adjacent chamber walls to prevent leakage of air or material along the end wall of the chamber. The cylindrical end portions of the shaft protrude a substantial distance on either side of the air lock chamber, and are enclosed by extensions of the air lock housing that form cooling chambers for the shaft. Consequently, it can be journaled at its outermost ends without requiring elaborate cooling systems for the shaft or special, high temperature bearings.

BRIEF DESCRIPTION OF THE DRAWINGS

For a better understanding of the invention, reference may be made to the following description of an exemplary embodiment, taken in conjunction with the figures of the accompanying drawings, in which:

FIG. 1 is a side elevational view, partly in section, of a rotary air lock apparatus according to the invention, with parts broken away to show the details of construction;

FIG. 2 is a vertical sectional view taken along the line 2—2 of FIG. 1 and looking in the direction of the arrows;

FIG. 3 is a detail view showing the overlapping construction and configuration of the end and center segments of the flexible blades;

DESCRIPTION OF AN EXEMPLARY EMBODIMENT

Figure 4:
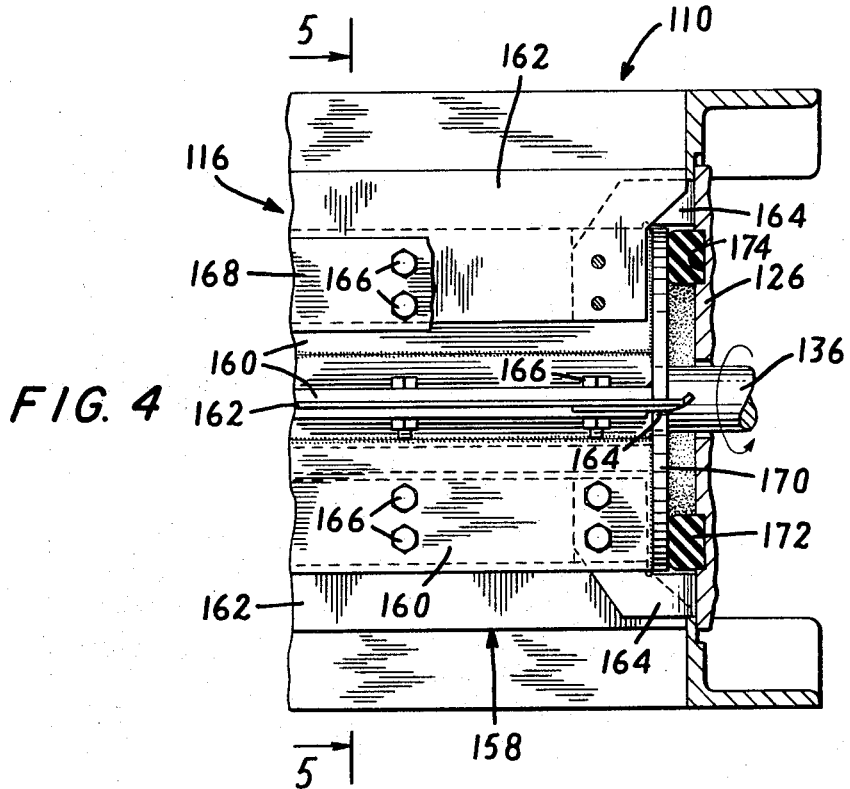
FIG. 4 is a side elevational view, partly in section, of another embodiment of the invention, with parts broken away for clarity.

A representative embodiment of rotary air lock apparatus constructed in accordance with the invention, as shown in FIGS. 1 to 3, includes a housing 10 having an elongated, generally cylindrical center portion 14, (see FIG. 2) which defines a similarly shaped chamber 16, and opposed openings 18 and 20 for admitting material to the chamber 16 and for discharging material from the chamber 16, respectively. Flanges 22 and 24 are formed around the inlet openings 18 and 20, respectively, to facilitate connection of the housing 10 to other elements (not shown) of material handling or processing systems.

The cylindrical chamber 16 is closed at either end by a plate 26 suitably attached by bolts 28 or other convenient means to laterally extending flanges 30 on the housing 10. The plates 26 are arranged on the housing 10 so that circular bosses 32 formed on the plates are received within cooperating recesses 34 formed on the housing 10 around the end openings of the chamber 16.

An elongated shaft 36 is disposed centrally of the chamber 16 and extends through aligned openings 38 in the end plates 26 to be journaled at its ends in conventional bearing supports 40 and 42. A conventional power transfer mechanism 44, (shown schematically in FIG. 1) such as a clutch or the like, is provided on one end of the shaft 36 for connection to a rotary drive system (not shown).

The bearing supports 40 and 42 are spaced sufficiently distant from the end plates 26 of the housing 10 that the shaft 36 is cooled, by ordinary radiation cooling, to an extent that it can be journaled in a conventional manner in the supports 40 and 42. Thus, even though the air lock apparatus is operated at elevated temperatures, say, on the order of 1,000° F. elaborate cooling systems for the bearings are not required. Cages 48 having open spaces 50 are interposed between the bearing supports 40 and 42 and the housing 10 to afford protection for the shaft 36, while allowing adequate ventilation for cooling purposes.

Leakage of air, or other gaseous mediums, and material along the shaft 36 is prevented by compression seals established by packing members 52, socket members 54, and gland members 56. The gland members 56 are adjustably secured to the sockets 54, as by bolts 57, for example, so that the required amount of pressure can be applied to the packing members 52 to maintain an effective seal with the shaft. The packing members 52 are formed of a heat resistant material and, if desired, may be lubricated with a high temperature lubricant to facilitate rotation of the shaft 36 and to reduce wear to the packing members.

The portion of the shaft 36 within the chamber 16 preferably is formed to have a square cross-section (see FIG. 2) over most of the length of the chamber, although any suitable cross-section, including circular, may be used. A plurality of blades 58 are mounted on the square portion of the shaft 36 by two generally V-shaped brackets 60 which are secured in any appropriate fashion, as, for example, by bolts, welds, or even casting, to opposite sides of the shaft. In the embodiment shown, the brackets 60 are arranged to support four blades 58 at approximately 90° intervals. It will be understood, of course, that any desired number and spacing of blades 58 can be used, the four blades 58 and the two associated brackets 60 representing only one suitable arrangement.

Each blade 58 is formed of three sheet-like segments, including an elongated center segment 62 and two separate end segments 64 (see FIG. 1), all of which are secured at their radially inner portions to the legs of the brackets 60 by a series of bolts or rivets 66 and an elongated backing strip 68. The center segments 62 are dimensioned with respect to the chamber 16 and the brackets 60 to engage the cylindrical side walls of the chamber 16 along the radially outer edge of the segments so as to be bent about an axis generally parallel to the longitudinal axis of the shaft 36 in a direction opposite to the rotational direction of the shaft (see FIG. 2). The bending of the center segments 62 is shown exaggerated in FIG. 2 for clarity.

Engagement is maintained between the segments 62 and the cylindrical walls of the chamber at all operating temperatures. This assures that a tight seal exists at all times against the leakage of gas or material past the outer edges of the blades 58. Any expansion or contraction of the blade segments 62 in the radial direction caused by fluctuation of operating temperatures merely results in the segments 62 being flexed to a slightly greater or lesser extent, as the case may be, and, does not, as in prior art devices, impair the integrity of the seal or produce significantly increased frictional resistance tending to reduce the efficiency of the operation of the air lock apparatus.

In addition, provision is made for free expansion of the segments 62 in the longitudinal direction by dimensioning the segments to be slightly shorter than the longitudinal extent of the chamber 16. In FIG. 3, the center segment 62 is shown spaced from the adjacent end plate 26 by a distance $a$ sufficient to allow for full thermal expansion of the segment 62 in the longitudinal direction without the segment end contacting the inner surface of the plate 26. There is, therefore, no possibility that the blades 58 will be expanded because of thermal effects to an extent that the blades will bear against the end walls 26 of the chamber 16.

It is an important feature of the invention, that notwithstanding that the center segments 62 of the blades 58 are spaced from the end walls 26, a tight seal is established at all times between the blades 58 and the end walls 26. To this end, the end segments 64 are constructed to be mounted in overlapping relation (see FIG. 3) to the center segments 62 so as to extend beyond the center segments and engage the end walls 26. By reason of such engagement, the end segments 64 are deflected, (shown exaggerated in FIGS. 1 and 2) in a direction opposite to rotational direction of the shaft, about an axis generally perpendicular to the longitudinal axis of the shaft. Any expansion or contraction of the end segments 64 in the longitudinal direction, therefore, will result merely in a corresponding greater or lesser bending of the segments, with no reduction in the effectiveness of the seal formed with the wall 26 and without any significant increase in friction forces.

The segments 64 also extend inwardly into abutting or near abutting relation with the cylindrical portions of the shaft 36 between the end walls 26 and the square part of the shaft, and outwardly to a point spaced from the cylindrical side walls of the chamber 16, as represented by the distance $b$ in FIG. 3. The distance $b$ is selected so that the end segments 64 are free to expand at high temperatures in the radial direction without engaging the inner surfaces of the cylindrical walls of the chamber.

The overlapping portions of the center segments 62 and the end segments 64 are preferably cut away, in the manner shown in FIG. 3, to reduce the stiffening effect of the overlapped structure, thus allowing the respective center and end segments to bend readily in response to temperature induced changes in length. Other configurations of the segments can, of course, be used.

Figure 5:
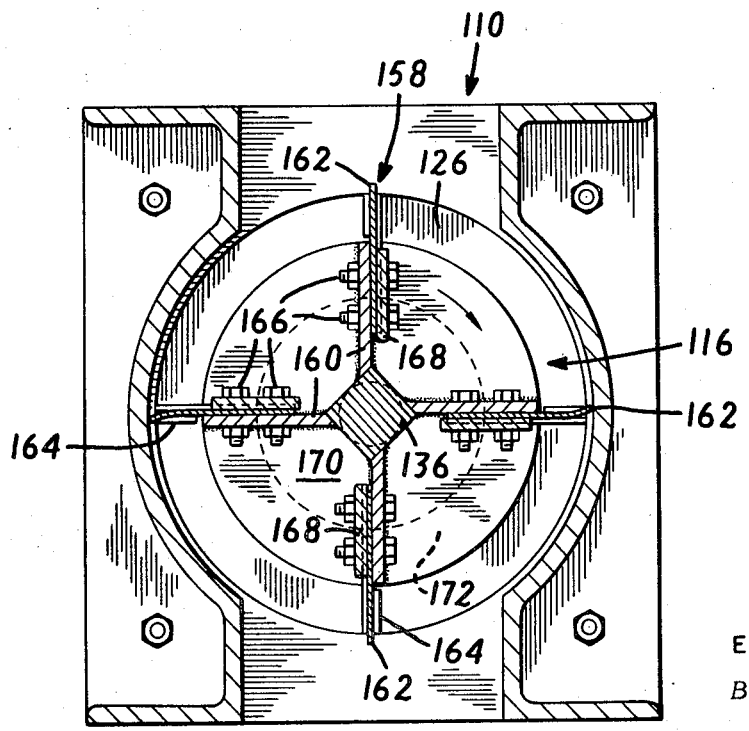
FIG. 5 is a vertical sectional view taken along the line 5—5 of FIG. 4 and looking in the direction of the arrows.

Another embodiment of the invention, embracing additional advantageous features, is shown in FIGS. 4 and 5. In general, this embodiment of the air lock apparatus has the same organization as the foregoing embodiment, including a housing 110 and end plates 126, defining a chamber 116, and a shaft 136, with a square center portion that extends through the chamber 116.

With particular reference to FIG. 5, four blades 158 are attached to the square portion of the shaft 136 by plate-like brackets 160 that are butt welded, cast, or otherwise suitably mounted on the shaft. As before, each plate 158 includes a center segment 162 and two end segments 164 (see FIG. 4) and is constructed of suitable sheet material and secured to a bracket 160 by bolts or rivets 166 and a backing member 168. Also, as in the previously described embodiment, the blade segments 162 and 164 are respectively dimensioned to make sealing engagement with the cylindrical side walls and end walls of the chamber 116, while allowing for thermally induced expansion or contraction without impairment of the seals and without binding against the chamber walls.

A generally circular plate 170 is attached, by welding or otherwise, to the axial ends of the brackets 160, thereby closing off the ends of a large portion of the pockets formed between the plates 158. It will be recognized that with this construction leakage of material along the end walls of the chamber 116 is substantially prevented, inasmuch as the bulk of the material passed through the air lock apparatus is confined to the elongate, virtually leakproof receptacles formed by the shaft 136, brackets 160, and plates 170. This is, of course, particularly true when the apparatus is operated at less than capacity throughput.

Furthermore, any material that may not be so confined by the end plates 170, as well as gases, vapors, and the like, are prevented from leaking along the end walls of the chamber 116 by annular seal members 172 positioned between the plates 126 and the plates 170. Suitably, the seal members 172 are constructed of heat-resistant material and, in addition, may advantageously be lubricated with a high-temperature lubricant to facilitate rotation of the plates 172 and to reduce wear at the seal interfaces. The seal members 172 may be mounted within the chamber 116 in any convenient manner, one of which, as shown in FIG. 4, is by providing grooves 174 in the plates 126 for receiving the seal members.

As is apparent from FIG. 4, the blade segments 162 and 164 are shaped to extend radially and axially past the end plates 170 so as to bear against the cylindrical side walls and end walls, respectively, of the chamber 116. Accordingly, the center segment 162 has a generally Y-shape, with the trunk of the Y secured to a bracket 160 in the manner previously described. The end segments 164, on the other hand, take an L-shape configuration and, as before, are mounted on a bracket 160 along with the center segment 162 in overlapping relation. Again, the segments 164 are cutaway at the overlapped areas, as indicated by the dashed lines in the FIG. 4, to enhance the flexibility of the blades 58.

Suitably, the blades, as well as the other elements of the apparatus which contact directly the material passed through the apparatus, are constructed of corrosion resistant material, such as stainless steel or the like. For example, the blade segments 62, 64, 162 and 164 can be made of type 321 stainless steel of a thickness on the order of 0.015 inches. Use of stainless steel sheet of approximately this gauge provides a blade of the requisite flexibility and durability, while keeping frictional forces between the blades and the housing at a minimum.

By the foregoing construction, the blade segments 62 and 162 and 64 and 164 are independently flexible, i.e., each is capable of bending about a separate axis, in a manner not attainable with a blade formed as a single, integral whole.

Accordingly, effective seals are established along the periphery and both ends of the cylindrical chamber 16 to prevent the leakage of gas or material through the apparatus. It is an important feature of the invention that seal integrity is, therefore, maintained over a wide range of operating temperatures.

Thus, although the invention is particularly suited for high temperature use, for example, at temperatures in the range of 1000° F, it can also be used with no sacrifice in operating efficiency at low and moderate temperatures. In addition, the apparatus can be used to advantage in pressurized systems to transfer material from a high pressure environment to a low pressure environment, or vice versa, whether accompanied by a temperature change or not. Of course, the apparatus can also be used in uniform temperature and uniform pressure systems, or in systems in which only one of these factors is varied.

An example of an application for which the rotary air lock apparatus is especially well suited, is where it is desired to transfer a fine, powdery material from a high temperature dryer, in which the material has been dried, to a carryoff conveyor, while preventing leakage of the drying gas through the transfer apparatus. In such an application, it is likely that substantial temperature differences will exist between the inlet and outlet ends of the transfer apparatus, i.e., the air lock apparatus, and it is, therefore, important that the apparatus be capable of maintaining a gas-tight seal at all temperatures encountered. Whereas, in conventional air lock devices, these conditions often produce warping of the rotary drum or blades, and consequent loss of the seal against gas leakage, with the apparatus of the present invention seal integrity is maintained unimpaired both on high temperature side and the low temperature side of the air lock.

I claim:

1. Rotary air lock apparatus for operation at temperatures up to and above approximately 1000° F. comprising:

a housing defining a generally cylindrical chamber having axially spaced end walls, inlet means in the housing communicating with the chamber for passing material to the chamber, outlet means in the housing spaced from the inlet means and communicating with the chamber for discharging material from the chamber, and blade means, including a plurality of flexible, segmented sheet-like metal blades, rotatably mounted in the housing and cooperating with the walls of the chamber to form pockets for transferring material from the inlet means to the outlet means, each blade including a center segment of a radial extent to make sealing engagement with a cylindrical side wall of the chamber at all operating temperatures and of a longitudinal extent smaller than the distance between the end walls of the chamber by substantially no more than the distance required to allow full thermal expansion of the center segment in the longitudinal direction at the highest operating temperature to be encountered without engagement of the longitudinal ends of the center segment with the end walls of the chamber and two flexible end segments, one positioned in overlapping relation to each end of the center segment and flexible independently of the center segment, of a longitudinal extent to make sealing engagement with the adjacent end wall of the chamber at all operating temperatures and the radially outer edges of which are spaced from the cylindrical side walls of the chamber by a distance substantially no larger than that required to allow full thermal expansion of the end segments in the radial direction at the highest operating temperature to be encountered without engagement of the radially outer edges thereof with the cylindrical side walls of the chamber.

2. Apparatus according to claim 1 in which the blade means further comprises:

a shaft rotatably mounted in the housing intermediate the inlet means and the outlet means and extending longitudinally through the chamber between the end walls, and means for mounting each blade on the shaft for rotation therewith.

3. Apparatus according to claim 2 in which the ends of the shaft project substantially beyond the end walls of the chamber and which further comprises:

means for journaling each shaft end at a substantial distance from the adjacent end wall of the chamber to allow radiant dissipation of heat conducted along the shaft toward the journaling means.

4. Apparatus according to claim 2 in which:

the shaft includes a square center portion disposed within the chamber, and in which four blades are mounted on the square center portion of the shaft by two generally V-shaped brackets attached at the closed ends to opposite sides of the shaft, each individual blade being secured to a separate one of the legs of the V-shaped brackets.

5. Apparatus according to claim 2 further comprising:

a pair of spaced, generally circular plates carried by the shaft in spaced relation to the end walls of the chamber, a plurality of brackets extending longitudinally along the shaft between the spaced plates and corresponding in number to the number of blades carried by the shaft, each bracket having attached thereto one of the blades, and means defining a seal between the end walls of the chamber and the plates carried by the shaft for preventing leakage of material or gases between the plates and the chamber end walls.

* * * * *